United States Patent
Zha et al.

(10) Patent No.: US 10,026,086 B2
(45) Date of Patent: Jul. 17, 2018

(54) ACCOUNT PROCESSING METHOD, APPARATUS, SYSTEM AND SERVER FOR PROVIDING AN ALERT MESSAGE

(71) Applicant: TENCENT TECHNOLOGY (SHENZHEN) COMPANY LIMITED, Shenzhen (CN)

(72) Inventors: Wen Zha, Shenzhen (CN); Hui Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/114,173

(22) PCT Filed: May 23, 2013

(86) PCT No.: PCT/CN2013/076142
§ 371 (c)(1),
(2) Date: Oct. 25, 2013

(87) PCT Pub. No.: WO2014/172948
PCT Pub. Date: Oct. 30, 2014

(65) Prior Publication Data
US 2016/0300230 A1 Oct. 13, 2016

(30) Foreign Application Priority Data
Apr. 22, 2013 (CN) .......................... 2013 1 0140800

(51) Int. Cl.
*G06Q 40/00* (2012.01)
*G06F 15/16* (2006.01)
(Continued)

(52) U.S. Cl.
CPC ... *G06Q 20/4016* (2013.01); *G06F 17/30864* (2013.01); *G06Q 50/01* (2013.01);
(Continued)

(58) Field of Classification Search
CPC ...... G06Q 40/02; G06Q 20/40; G06Q 20/382; G06Q 20/4016; G06Q 20/3829;
(Continued)

(56) References Cited

U.S. PATENT DOCUMENTS

2003/0217001 A1 11/2003 McQuaide, Jr. et al.
2008/0319889 A1* 12/2008 Hammad ............... G06Q 20/04
705/35

FOREIGN PATENT DOCUMENTS

WO WO 2012/142865 * 10/2012 ............. H04L 29/08

OTHER PUBLICATIONS

Ben Patterson, How do I recover my hacked Facebook account, http://heresthethingblog.com/2011/10/17/recover-hacked-facebook-account/, Oct. 17, 2011.*
(Continued)

*Primary Examiner* — Hao Fu
(74) *Attorney, Agent, or Firm* — Anova Law Group, PLLC

(57) ABSTRACT

The present invention provides an account processing method, apparatus system and server for providing an alert message, and relates to the field of computer technology. The method is for use in a server processing a first account, the method comprising: determining whether the first account meets a processing condition; if the first account meets the processing condition, freezing all information related to the first account; and providing an alert message based on the processing condition to a second account associated with the first account. The embodiments of the present invention comprise, after determining that the first account meets a processing condition, freezing all of the information associated with the first account and displaying an alert message to the second account associated with the first account. Friends of the legitimate user can see the alert
(Continued)

message associated with the first account during the first account's freezing period, and can contact the legitimate user offline and inform the user that the legitimate user's account is frozen or about to be cancelled. Thus, embodiments of the present invention address the problem of an illegal user processing the first account without the knowledge of the legitimate user, and prevent the immeasurable loss caused by the cancellation of the first account.

16 Claims, 3 Drawing Sheets

(51) Int. Cl.
    *G06Q 20/40*     (2012.01)
    *H04W 12/08*     (2009.01)
    *G06F 17/30*     (2006.01)
    *G06Q 50/00*     (2012.01)
    *H04L 12/58*     (2006.01)
    *H04L 29/06*     (2006.01)

(52) U.S. Cl.
    CPC .............. *H04L 51/32* (2013.01); *H04L 67/42* (2013.01); *H04W 12/08* (2013.01)

(58) Field of Classification Search
    CPC ......... G06Q 50/01; H04L 29/08; H04L 51/21; H04W 4/02
    USPC .......................................................... 705/35
    See application file for complete search history.

(56) References Cited

OTHER PUBLICATIONS

International Search Report for corresponding PCT Application No. PCT/CN2013/076142, dated Jul. 4, 2013.

\* cited by examiner

ACCOUNT PROCESSING METHOD, APPARATUS, SYSTEM AND SERVER FOR PROVIDING AN ALERT MESSAGE

CROSS-REFERENCE TO RELATED APPLICATIONS

This application is a continuation of International Patent Application No. PCT/CN2013/076142, entitled "Account Processing Method, Apparatus, System and Server for Providing an Alert Message," filed on May 23, 2013. This application claims the benefit and priority of Chinese Patent Application No. 201310140800.9, entitled "Account Processing Method, Apparatus, System and Server for Providing an Alert Message," filed on Apr. 22, 2013. The entire disclosures of each of the above applications are incorporated herein by reference.

TECHNICAL FIELD

The present invention relates to the field of computer technology, and more particularly, to an account processing method, apparatus, system and server for providing an alert message.

BACKGROUND

In order to strengthen the confidentiality of user information, many countries have laws requiring Internet service providers to provide users with the capability to cancel their accounts in a computer system along with the capability to register and log on to the computer system. The cancelation capability can be used to erase all user information on the server.

The prior art account cancellation method includes the following steps: the user sending a cancellation request to the server to cancel the account, the server freezing the account after receiving the cancellation request; when the user logs in to his account next time, the server displaying a cancellation alert message on the login screen; if the server does not receive information to rescind the account cancelation during the freezing period, deleting all information related to this account at the end of the freezing period.

The prior art technology has at least the following problem: after an illegal user pirates an account, the illegal user normally will cancel the account after the illegal use to erase the traces of the illegal use; if the legitimate user does not log in to the account during the freezing period, the legitimate user will not know that the account is being cancelled, and cannot act accordingly to prevent the cancelation of the account. At the end of the freezing period, the server will delete all data, address books, uploaded contents, or virtual properties in the account, causing immeasurable loss to the user.

SUMMARY OF THE INVENTION

To address the problem in the prior art where an account is being cancelled without the knowledge of the legitimate user and causing immeasurable loss to the legitimate user, the embodiments of the invention provide an account processing method, apparatus, system and server for providing an alert message.

In accordance with a first aspect of the present invention, an account processing method for providing an alert message for use in a server processing a first account is provided, the method comprising:

determining whether the first account meets a processing condition;
if the first account meets the processing condition, freezing all information related to the first account; and
providing an alert message based on the processing condition to a second account associated with the first account, wherein the alert message indicates that the first account is frozen, the first account will be cancelled after a first predetermined time, or the first account will be released after a second predetermined time.

In accordance with a second aspect of the present invention, an account processing apparatus for providing an alert message for use in a server processing a first account is provided, the apparatus comprising:

a determining module for determining whether the first account meets a processing condition;
a freezing module for freezing all information related to the first account if the first account meets the processing condition; and
a display module for providing an alert message based on the processing condition to a second account associated with the first account, wherein the alert message indicates that the first account is frozen, the first account will be cancelled after a first predetermined time, or the first account will be released after a second predetermined time.

In accordance with a third aspect of the present invention, a server is provided, the serve comprising the account processing apparatus in accordance with the second aspect of the present invention.

In accordance with a forth aspect of the present invention, an account processing system for providing an alert message is provided, the system comprising a client and the server in accordance with the third aspect of the present invention, wherein the client comprises an electronic device for logging in to the first account or the second account.

The technical solution provided by the embodiments of the present invention has the following advantages: after determining that the first account meets a processing condition, displaying an alert message to the second account associated with the first account, and freezing all of the information associated with the first account. Friends of the legitimate user can see the alert message associated with the first account during the first account's freezing period, and can contact the legitimate user offline and inform the user that the legitimate user's account is frozen or about to be cancelled. Thus, embodiments of the present invention address the problem of an illegal user processing the account without the knowledge of the legitimate user. By having friends of the legitimate user to monitor whether the account of the legitimate user is about to be cancelled, and if so, notify the legitimate user, the embodiments of the present invention prevent the immeasurable loss caused by the cancellation of the first account.

BRIEF DESCRIPTION OF THE DRAWINGS

To better illustrate the technical features of the embodiments of the present invention, various embodiments of the present invention will be briefly described in conjunction with the accompanying drawings. It is obvious that the draws are but for exemplary embodiments of the present invention, and that a person of ordinary skill in the art may derive additional draws without deviating from the principles of the present invention.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings. In the following discussion, the term "client" may refer to, a client terminal device, which includes but is not limited to, a desktop computer, a laptop, a netbook, a tablet, a mobile phone, a multimedia TV and other electronic equipment, or a client side application program, and the term "server" may refer to, but is not limited to, a corresponding server of various online forums, a game server, or a corresponding server of a network operator.

EXAMPLE 1

Figure 1:
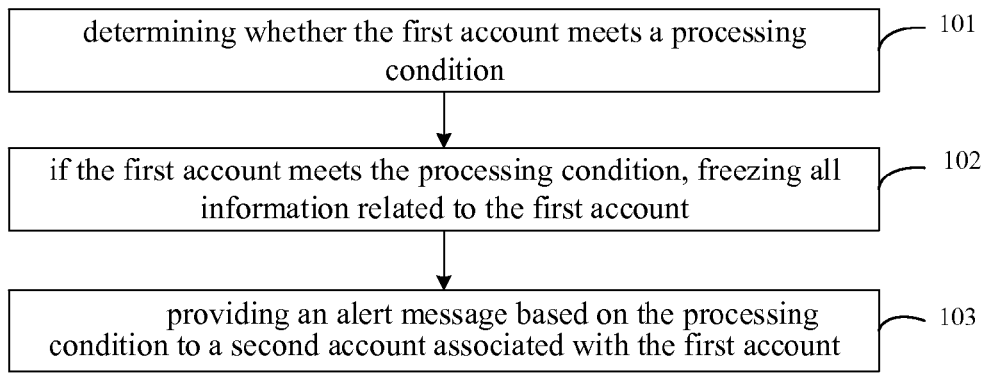
FIG. 1 is an exemplary flowchart for an account processing method for providing an alert message in accordance with a first embodiment of the present invention.

As shown in FIG. 1, an exemplary flowchart for an account processing method for providing an alert message in accordance with a first embodiment of the present invention is provided. The account processing method for providing an alert message may be used in a server. The account processing method for providing an alert may comprise the following steps:

Step 101: determining whether the first account meets a processing condition.

The first account is obtained by the user by registering with the server.

There are three circumstances in determining whether the first account meets a processing condition:

First, receiving a request to process the first account; and after receiving the request to process the first account, confirming the first account meets the processing condition, wherein the processing condition is a cancellation condition.

For example, in the cancellation scenario, the first account is an account that the user registered at an online forum. When the user logs in to the first account, the user can use the first account to send a cancelation request to the corresponding server of the online forum to cancel the first account. After receiving the cancellation request, the server can determine that the user logged in to the first account wants to cancel the first account, and confirms the first account meets the cancellation condition.

Second, determining whether the number of complaints filed against the first account is greater than a predetermined threshold value; and if the number of complaints filed against the first account is greater than the predetermined threshold value, confirming that the first account meets the processing condition wherein the processing condition is a suspension condition.

For example, in the suspension scenario, the first account is an account that the user registered at an online forum. If the user logs in to the first account, and uses the first account to send illegal information or information that does not comply with the rules and regulations of the online forum, other users of the online forum may file complaints against the first account to the server. The corresponding server of the online forum will receive the complains against the first account, and can calculate the number of complaints filed against the first account. If the result of the calculation shows that the number of complaints filed against the first account is greater than a predetermined threshold value, then it can confirm that the first account meets the suspension condition.

Third, determining whether there is a fee due for the first account; and if there is a fee due for the first account, confirming that the first account meets the processing condition wherein the processing condition is a payment condition.

For example, in the payment scenario, the first account is an account that the user registered at a corresponding server of a network operator or an online game. Usually, the first account needs to be charged before its use. When the server determines that the balance in the first account has been exhausted so that the first account is temporarily unavailable without making a payment, it can confirm that the first account meets the payment condition.

If the result shows that the first account meets the processing condition, proceed to step 102.

Step 102: if the first account meets the processing condition, freezing all information related to the first account.

In another words, when the server confirms that the first account meets the processing condition, all information related to the first account can be frozen so that when the user logs in to the first account next time, the user cannot operate on information related to the first account.

Step 103: providing an alert message based on the processing condition to a second account associated with the first account, wherein the alert message indicates that the first account is frozen, the first account will be cancelled after a first predetermined time, or the first account will be released after a second predetermined time.

The alert message may include pre-cancellation information, freezing information or pre-release information. The pre-cancellation information indicates that the first account will be cancelled after the first predetermined time. The freezing information indicates that the first account is frozen. The pre-release information indicates that the first account will be released after the second predetermined time.

In different scenarios, and based on the processing condition, the alert message displayed to the second account associated with the first account may fall into three circumstances:

First, if the processing condition is the cancellation condition, displaying in the second account associated with the first account pre-cancellation information, or freezing information and pre-cancellation information.

For example, in the cancellation scenario, when the server determines that the first account meets the cancellation condition, it displays pre-cancellation information to the second account associated with the first account, such as "the first account will be cancelled in xx days," or displays freezing information and pre-cancellation information to the second account associated with the first account, such as "the first account is frozen, and this account will be cancelled in xx days." Specifically, when the server determines that the first account meets the cancelation condition, it means that the first account is about to be cancelled. If the first account has already been frozen, the server can display to the second account associated with the first account that the first account is frozen, or that the first account is frozen and will be cancelled after a first predetermined time period.

Second, if the processing condition is the suspension condition, displaying in the second account associated with the first account freezing information, freezing information and pre-cancellation, or freezing information and pre-release information.

For example, in the suspension scenario, when the server determines that the first account meets the suspension condition, it displays freezing information to the second account associated with the first account, such as "the first account is frozen", or freezing information and pre-cancellation information to the second account associated with the first account, such as "the first account is frozen, and this account will be cancelled in xx days"; or freezing information and pre-release information to the second account associated with the first account, such as "the first account is frozen, and this account will be released in xx days." Specifically, if an account registered by a seller has been reported many times, the server can permanently freeze the account to prevent the seller from maliciously deceiving the consumers, and always displays freezing information to the second account associated with the first account. Of course, the server can also cancel the first account after a first predetermined time period, and correspondingly, display freezing information and pre-cancellation information to the second account associated with the first account after the first account is frozen. Furthermore, the server can also release the first account after a second predetermined time period, and correspondingly, display freezing information and pre-release information to the second account associated with the first account after the first account is frozen.

Third, if the processing condition is the payment condition, displaying in the second account associated with the first account freezing information, or freezing information and pre-cancellation information.

For example, in the payment scenario, when the server determines that the first account meets the payment condition, it displays freezing information to the second account associated with the first account, such as "the first account is frozen," or displays freezing information and pre-cancellation information to the second account associated with the first account, such as "the first account is frozen, and this account will be cancelled in xx days." Specifically, if a user registers an account with a corresponding server of a network operator, and there is a balance in the first account, the server may freeze the first account temporarily, and correspondingly, display to the second account associated with the first account that the first account is frozen. If the balance in the first account is overdue for a long period of time, the server can also cancel the first account, and correspondingly, display pre-cancellation information to the second account associated with the first account after the first account is frozen.

It should be noted that the freezing information, pre-cancellation information and pre-release information illustrated above are merely exemplary examples, and the present embodiment of the prevent invention does not limit the specific contents of the freezing information, pre-cancellation information and pre-release information.

It should also be noted that, in the cancellation scenario, the account processing method for providing an alert message can also include: determining the freezing time of the first account has reached a third predetermined time; if the freezing time of first account has reached a third predetermined time, deleting all of the information related to the first account. For example, if no request to rescind the cancellation of the first account is received after the freezing time for the first account has reached the third predetermined time, it is likely that the legitimate user of the first account wants to cancel the first account. Thus, the server will delete all of the information related to the first account to avoid the disclosure of information related to the first account.

It should also be noted that, in the suspension scenario, if a permanent suspension on the first account is desired, then step 101 to step 103 should be performed. If the suspension on the first account is to be released after a period of time, then the account processing method for providing an alert message can further include: determining whether the freezing time of the first account has reached a fourth predetermined time; if the freezing time of the first account has reached a fourth predetermined time, then release the first account. In another words, the first account under suspension can be suspended permanently (or permanently frozen), or can be released after being suspended for a period of time. For example, after the first account of a seller has been reported for many times, the first account can be permanently suspended to prevent the seller from maliciously defrauding the consumers by performing step 101 to step 103. For another example, when the first account in the online forum is reported many times for sending illegal information, the server can freeze the first account (i.e., to suspend the first account) to warn the legitimate user of the first account not to send illegal information any more. When the freezing time reaches the fourth predetermined time, the server can release the first account, and enable the legitimate user of the first account to continue to use the first account in the online forum.

It should also be noted that, in the payment scenario, the account processing method for providing an alert message can also include: recording freezing time; determining whether a fee has been paid during the fifth predetermined time period starting from the freezing time; if a fee has been paid during the fifth predetermined time period starting from the freezing time, releasing the first account; if a fee has not been paid during the fifth predetermined time period starting from the freezing time, freezing or deleting all information related to the first account. In another words, in some scenarios, if a fee has not paid to the first account, the first account can be frozen until a fee is paid to release the first account. Here, the fifth predetermined time can be the same as the second predetermined time. In other scenarios, such as if there is a fee due for the first account associated with a cellphone number, the first account can be frozen; and if the fee is not paid to the first account in a predetermined time period, then the user of the first account likely would not want to continue to use the first account. Thus, when the first account is frozen for a predetermined time period, all information related to the first account can be deleted, so that the network operator can provide the first account as a new account without any information to other users.

In sum, this embodiment of the present invention provides an account processing method for providing an alert message: after determining that the first account meets a processing condition, displaying an alert message to the second account associated with the first account, and freezing all of the information associated with the first account. Friends of the legitimate user can see the alert message associated with the first account during the first account's freezing period, and can contact the legitimate user offline and inform the user that the legitimate user's account is frozen or about to be cancelled. Thus, this embodiment of the present invention addresses the problem of an illegal user processing the account without the knowledge of the legitimate user. By having friends of the legitimate user to monitor whether the account of the legitimate user is about to be cancelled, and if so, notify the legitimate user, this embodiment of the present invention prevents the immeasurable loss caused by the cancellation of the first account.

EXAMPLE 2

Figure 2:
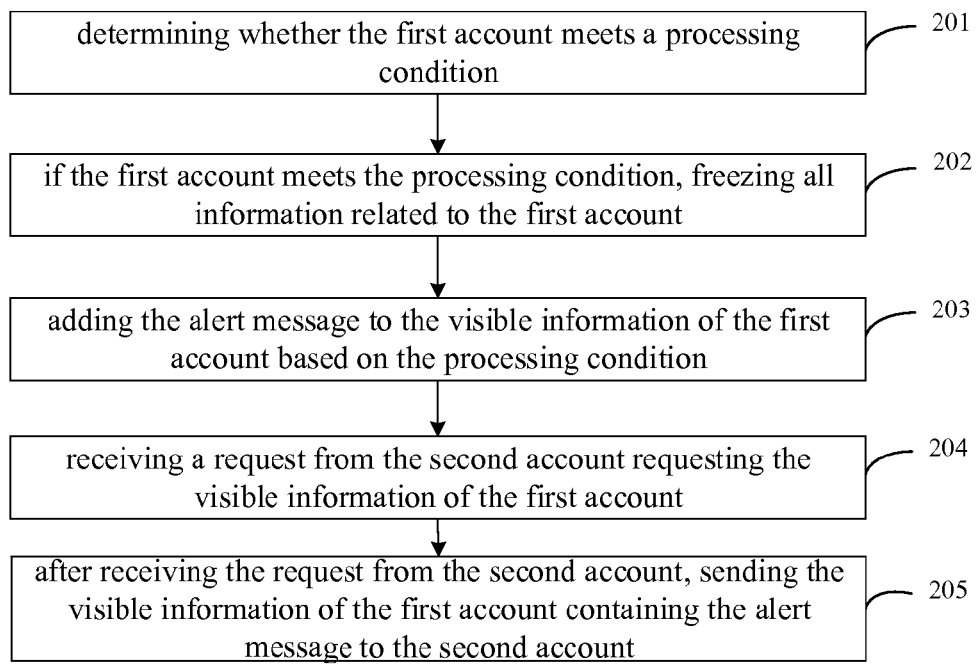
FIG. 2 is an exemplary flowchart for an account processing method for providing an alert message in accordance with a second embodiment of the present invention.

As shown in FIG. 2, an exemplary flowchart for an account processing method for providing an alert message in accordance with a second embodiment of the present invention is provided. The account processing method for providing an alert message may be used in a server. The account processing method for providing an alert may comprise the following steps:

Step 201: determining whether the first account meets a processing condition.

The first account is obtained by the user by registering with the server.

There are three circumstances in determining whether the first account meets a processing condition:

First, receiving a request to process the first account; and after receiving the request to process the first account, confirming the first account meets the processing condition, wherein the processing condition is a cancellation condition.

For example, in the cancellation scenario, the first account is an account that the user registered at an online forum. When the user logs in to the first account, the user can use the first account to send a cancelation request to the corresponding server of the online forum to cancel the first account. After receiving the cancellation request, the server can determine that the user logged in to the first account wants to cancel the first account, and confirms the first account meets the cancellation condition.

Second, determining whether the number of complaints filed against the first account is greater than a predetermined threshold value; and if the number of complaints filed against the first account is greater than the predetermined threshold value, confirming that the first account meets the processing condition wherein the processing condition is a suspension condition.

For example, in the suspension scenario, the first account is an account that the user registered at an online forum. If the user logs in to the first account, and uses the first account to send illegal information or information that does not comply with the rules and regulations of the online forum, other users of the online forum may file complaints against the first account to the server. The corresponding server of the online forum will receive complains against the first account, and can calculate the number of complaints filed against the first account. If the result of the calculation shows that the number of complaints filed against the first account is greater than a predetermined threshold value, then it can confirm that the first account meets the suspension condition.

Third, determining whether there is a fee due for the first account; and if there is a fee due for the first account, confirming that the first account meets the processing condition wherein the processing condition is a payment condition.

For example, in the payment scenario, the first account is an account that the user registered at a corresponding server of a network operator or an online game. Usually, the first account needs to be charged before its use. When the server determines that the balance in the first account has been exhausted so that the first account is temporarily unavailable without making a payment, it can confirm that the first account meets the payment condition.

If the result shows that the first account meets the processing condition, proceed to step 202.

Step 202: if the first account meets the processing condition, freezing all information related to the first account.

In another words, when the server confirms that the first account meets the processing condition, all information related to the first account can be frozen so that when the user logs in to the first account next time, the user cannot operate on information related to the first account, unless the user uses a rescinding program on the server to rescind the cancelation of the first account.

Step 203: adding the alert message to the visible information of the first account based on the processing condition.

Visible information is information related to the first account that is displayed to the second account, or what can be seen regarding the first account after logging in to the second account. Generally, the second account referred here can be a friend of the first account, or an account that is a friend of the first account, but can receive or search the visible information of the first account.

If the visible information is image information, then convert the image associated with the first account to grayscale.

For example, if the results show that the first account meets the processing condition, then convert the image associated with the first account into grayscale so that the image associated with the first account seen by the friends of the first account will be a grayscale image.

If the visible information is image information, registration information, signature information, or information in a dialog window, then add the alert message to the registration information, signature information, or information in the dialog window.

The alert message may include pre-cancellation information, freezing information or pre-release information. The pre-cancellation information indicates that the first account will be cancelled after the first predetermined time. The freezing information indicates that the first account is frozen. The pre-release information indicates that the first account will be released after the second predetermined time.

In different scenarios, and based on the processing condition, adding the alert message to image information, registration information, signature information, or information in the dialog window may fall into three circumstances:

First, if the processing condition is the cancellation condition, adding pre-cancellation information, or freezing information and pre-cancellation information to image information, registration information, signature information, or information in the dialog window associated with the first account.

For example, in the cancellation scenario, when the server determines that the first account meets the cancellation condition, it adds pre-cancellation information to image information, registration information, signature information, or information in the dialog window associated with the first account, such as "the first account will be cancelled in xx days," or pre-freezing information and pre-cancellation information to image information, registration information, signature information, or information in the dialog window associated with the first account, such as "the first account is frozen, and this account will be cancelled in xx days."

Second, if the processing condition is the suspension condition, adding freezing information, freezing information and pre-cancellation, or freezing information and pre-release information to image information, registration information, signature information, or information in the dialog window associated with the first account.

For example, in the suspension scenario, when the server determines that the first account meets the suspension condition, it adds freezing information to image information, registration information, signature information, or information in the dialog window associated with the first account, such as "the first account is frozen", or freezing information and pre-cancelation information to image information, registration information, signature information, or information in the dialog window associated with the first account, such as "the first account is frozen, and this account will be cancelled in xx days"; or freezing information and pre-release information to image information, registration information, signature information, or information in the dialog window associated with the first account, such as "the first account is frozen, and this account will be released in xx days."

Third, if the processing condition is the payment condition, adding freezing information, or freezing information and pre-cancellation information to image information, registration information, signature information, or information in the dialog window associated with the first account.

For example, in the payment scenario, when the server determines that the first account meets the payment condition, it adds freezing information to image information, registration information, signature information, or information in the dialog window associated with the first account, such as "the first account is frozen," or freezing information and pre-cancellation information to image information, registration information, signature information, or information in the dialog window associated with the first account, such as "the first account is frozen, and this account will be cancelled in xx days."

It should be noted that the freezing information, pre-cancellation information and pre-release information illustrated above are merely exemplary examples, and the present embodiment of the prevent invention does not limit the specific contents of the freezing information, pre-cancellation information and pre-release information Step 204: receiving a request from the second account requesting the visible information of the first account.

In practice, after the second account logs in, it will send the server a request to obtain the visible information of the first account, or, after the second account logs in, the user of the second account sends a request to obtain the visible information of the first account by clicking or touching a link to the first account.

For example, after the second account logs in, the client for the second account will be automatically sending to the server a request requesting the visible information of all the friends of the second account, or all the accounts that the second account follows; correspondingly, the server will check all the friends of the second account and all the accounts that the second account follows. If the first account is among the friends of the second account or the accounts that the second account follows, then it can be confirmed that the server receives a request from the second account requesting the visible information of the first account.

For another example, after the second account logs in, the user of the second account clicks on the user name or image of the first account, meaning that the second account wants to view information of the first account, and send to the server a request requesting the visible information of the clicked first account.

For yet another example, after the second account logs in, the user of the second account puts the cursor of the mouse over the image of the first account, meaning that the second account wants to view information of the first account, and sends to the server a request requesting the visible information of the clicked first account.

Typically, if the first account and the second account are friends, then after login, the second account can request from the server all visible information of the first account. It should be noted that the second account here need not be first of the first account. For example, the first account and the second account are not friends, but the second account listens to the first account (i.e., the first account is an account that the second account follows), then the second account can receive all visible information of the first account.

After the server receives the request sent by the second account, proceed to step 205.

Step 205: after receiving the request from the second account, sending the visible information of the first account containing the alert message to the second account.

When the server receives the request from the second account requesting the visible information of the first account; the server sends the visible information of the first account containing the alert message to the second account. Correspondingly, the second account can see the visible information associated with the first account containing the alert message. For example, the second account can see a grayscale image associated with the first account, registration information and signature information of the first account containing the alert message, or the alert message in the dialog window with the first account.

It should also be noted that, in the cancellation scenario, the account processing method for providing an alert message can also include: determining the freezing time of the first account has reached a third predetermined time; if the freezing time of first account has reached a third predetermined time, deleting all of the information related to the first account. For example, if no request to rescind the cancellation of the first account is received after the freezing time for the first account has reached the third predetermined time, it is likely that the legitimate user of the first account wants to cancel the first account. Thus, the server will delete all of the information related to the first account to avoid the disclosure of information related to the first account.

It should also be noted that, in the suspension scenario, if a permanent suspension on the first account is desired, then step 201 to step 205 should be performed. If the suspension on the first account is to be released after a period of time, then the account processing method for providing an alert message can further include: determining whether the freezing time of the first account has reached a fourth predetermined time; if the freezing time of the first account has reached a fourth predetermined time, then release the first account. In another words, the first account under suspension can be suspended permanently (or permanently frozen), or can be released after being suspended for a period of time. For example, after the first account of a seller has been reported for many times, the first account can be permanently suspended to prevent the seller from maliciously defrauding the consumers by performing step 201 to step 205. For another example, when the first account in the online forum is reported many times for sending illegal information, the server can freeze the first account (i.e., to suspend the first account) to warn the legitimate user of the first account not to send illegal information any more. When the freezing time reaches the fourth predetermined time, the server can release the first account, and enable the legitimate user of the first account to continue to use the first account in the online forum.

It should also be noted that, in the payment scenario, the account processing method for providing an alert message can also include: recording freezing time; determining whether a fee has been paid during the fifth predetermined time period starting from the freezing time; if a fee has been paid during the fifth predetermined time period starting from the freezing time, releasing the first account; if a fee has not been paid during the fifth predetermined time period starting from the freezing time, freezing or deleting all information related to the first account. In another words, in some scenarios, if a fee has not paid to the first account, the first account can be frozen until a fee is paid to release the first account. Here, the fifth predetermined time can be the same as the second predetermined time. In other scenarios, such as if there is a fee due for the first account associated with a cellphone number, the first account can be frozen; and if the fee is not paid to the first account in a predetermined time period, then the user of the first account likely would not want to continue to use the first account. Thus, when the first account is frozen for a predetermined time period, all information related to the first account can be deleted, so that the network operator can provide the first account as a new account without any information to other users.

In sum, this embodiment of the present invention provides an account processing method for providing an alert message: after determining that the first account meets a processing condition, displaying an alert message to the second account associated with the first account, and freezing all of the information associated with the first account. Friends of the legitimate user can see the alert message associated with the first account during the first account's freezing period, and can contact the legitimate user offline and inform the user that the legitimate user's account is frozen or about to be cancelled. Thus, this embodiment of the present invention addresses the problem of an illegal user processing the account without the knowledge of the legitimate user. By having friends of the legitimate user to monitor whether the account of the legitimate user is about to be cancelled, and if so, notify the legitimate user, this embodiment of the present invention prevents the immeasurable loss caused by the cancellation of the first account.

EXAMPLE 3

Figure 3:
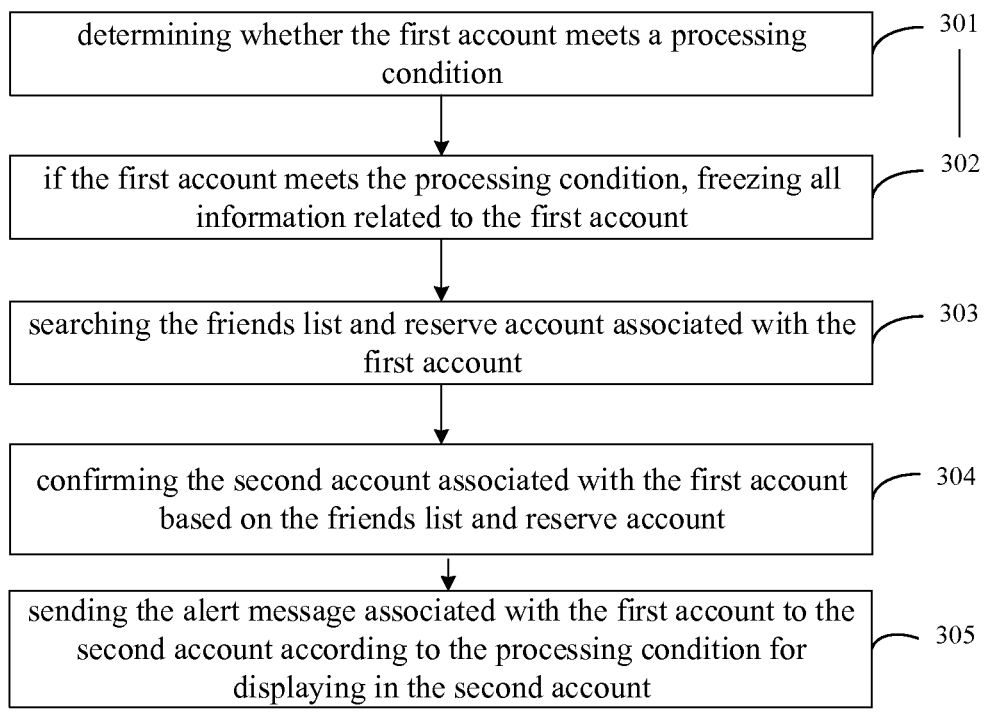
FIG. 3 is an exemplary flowchart for an account processing method for providing an alert message in accordance with a third embodiment of the present invention.

As shown in FIG. 3, an exemplary flowchart for an account processing method for providing an alert message in accordance with a third embodiment of the present invention is provided. The account processing method for providing an alert message may be used in a server. The account processing method for providing an alert may comprise the following steps:

Step 301: determining whether the first account meets a processing condition.

The first account is obtained by the user by registering with the server.

There are three circumstances in determining whether the first account meets a processing condition:

First, receiving a request to process the first account; and after receiving the request to process the first account, confirming the first account meets the processing condition, wherein the processing condition is a cancellation condition.

For example, in the cancellation scenario, the first account is an account that the user registered at an online forum. When the user logs in to the first account, the user can use the first account to send a cancelation request to the corresponding server of the online forum to cancel the first account. After receiving the cancellation request, the server can determine that the user logged in to the first account wants to cancel the first account, and confirms the first account meets the cancellation condition.

Second, determining whether the number of complaints filed against the first account is greater than a predetermined threshold value; and if the number of complaints filed against the first account is greater than the predetermined threshold value, confirming that the first account meets the processing condition wherein the processing condition is a suspension condition.

For example, in the suspension scenario, the first account is an account that the user registered at an online forum. If the user logs in to the first account, and uses the first account to send illegal information or information that does not comply with the rules and regulations of the online forum, other users of the online forum may file complaints against the first account to the server. The corresponding server of the online forum will receive complains against the first account, and can calculate the number of complaints filed against the first account. If the result of the calculation shows that the number of complaints filed against the first account is greater than a predetermined threshold value, then it can confirm that the first account meets the suspension condition.

Third, determining whether there is a fee due for the first account; and if there is a fee due for the first account, confirming that the first account meets the processing condition wherein the processing condition is a payment condition.

For example, in the payment scenario, the first account is an account that the user registered at a corresponding server of a network operator or an online game. Usually, the first account needs to be charged before its use. When the server determines that the balance in the first account has been exhausted so that the first account is temporarily unavailable without making a payment, it can confirm that the first account meets the payment condition.

If the result shows that the first account meets the processing condition, proceed to step 302.

Step 302: if the first account meets the processing condition, freezing all information related to the first account.

In another words, when the server confirms that the first account meets the processing condition, all information related to the first account can be frozen so that when the user logs in to the first account next time, the user cannot operate on information related to the first account.

In one cancellation scenario, when the user of the first account logs in to a client using the first account, the client displays the alert message in the user interface after login, such as "the first account will be cancelled in xx days." The user interface has a button for rescinding the cancellation, and the user can click this button to rescind the cancellation of the first account. Other than that, the user cannot operate on any other contents in the user interface. In another words, all information related to the first account is frozen so that the user cannot make an operation on any information related to the first account.

Step 303: searching the friends list and reserve account associated with the first account.

As all information related to the first account is stored on the server, the server can search through the friends list of the first account.

Reserve account is an account specified for the first account by the legitimate user of the first account. In another words, when the first account is to be processed, the server will notify the reserve account. The reserve account can be a friend of the first account, or not a friend of the first account.

Step 304: confirming the second account associated with the first account based on the friends list and reserve account.

When the reserve account is friend of the first account, then any account in the friend list of the first account will be considered to be a second account associated with the first account. When the reserve account is not a friend of the first account, then any account in the friend list of the first account and any reserve account will be considered to be a second account associated with the first account.

Step 305: sending the alert message associated with the first account to the second account according to the processing condition for displaying in the second account.

In another words, if the server determines that the first account meets the processing condition, it can take the initiative to send the alert message associated with the first account to the second account associated with the first account. The server can send the alert message associated with the first account to the second account associated with the first account in various forms. For example, the server can send the alert message associated with the first account to the second account associated with the first account by e-mail, through a dialog window, or through a popup window.

The alert message may include pre-cancellation information, freezing information or pre-release information. The pre-cancellation information indicates that the first account will be cancelled after the first predetermined time. The freezing information indicates that the first account is frozen. The pre-release information indicates that the first account will be released after the second predetermined time.

In different scenarios, and based on the processing condition, the alert message sent to the second account associated with the first account may fall into three circumstances:

First, if the processing condition is the cancellation condition, sending to the second account associated with the first account pre-cancellation information, or freezing information and pre-cancellation information.

For example, in the cancellation scenario, when the server determines that the first account meets the cancellation condition, it sends pre-cancellation information to the second account associated with the first account, such as "the first account will be cancelled in xx days," or freezing information and pre-cancellation information to the second account associated with the first account, such as "the first account is frozen, and this account will be cancelled in xx days."

Second, if the processing condition is the suspension condition, sending to the second account associated with the first account freezing information, freezing information and pre-cancellation, or freezing information and pre-release information.

For example, in the suspension scenario, when the server determines that the first account meets the suspension condition, it sends freezing information to the second account associated with the first account, such as "the first account is frozen", or freezing information and pre-cancelation information to the second account associated with the first account, such as "the first account is frozen, and this account will be cancelled in xx days"; or freezing information and pre-release information to the second account associated with the first account, such as "the first account is frozen, and this account will be released in xx days."

Third, if the processing condition is the payment condition, sending to the second account associated with the first account freezing information, or freezing information and pre-cancellation information.

For example, in the payment scenario, when the server determines that the first account meets the payment condition, it sends freezing information to the second account associated with the first account, such as "the first account is frozen," or displays freezing information and pre-cancellation information to the second account associated with the first account, such as "the first account is frozen, and this account will be cancelled in xx days."

It should be noted that the freezing information, pre-cancellation information and pre-release information illustrated above are merely exemplary examples, and the present embodiment of the prevent invention does not limit the specific contents of the freezing information, pre-cancellation information and pre-release information.

It should also be noted that, in the cancellation scenario, the account processing method for providing an alert message can also include: determining the freezing time of the first account has reached a third predetermined time; if the freezing time of first account has reached a third predetermined time, deleting all of the information related to the first account. For example, if no request to rescind the cancellation of the first account is received after the freezing time for the first account has reached the third predetermined time, it is likely that the legitimate user of the first account wants to cancel the first account. Thus, the server will delete all of the information related to the first account to avoid the disclosure of information related to the first account.

It should also be noted that, in the suspension scenario, if a permanent suspension on the first account is desired, then step 301 to step 305 should be performed. If the suspension on the first account is to be released after a period of time, then the account processing method for providing an alert message can further include: determining whether the freezing time of the first account has reached a fourth predetermined time; if the freezing time of the first account has reached a fourth predetermined time, then release the first account. In another words, the first account under suspension can be suspended permanently (or permanently frozen), or can be released after being suspended for a period of time. For example, after the first account of a seller has been reported for many times, the first account can be permanently suspended to prevent the seller from maliciously defrauding the consumers by performing step 301 to step 305. For another example, when the first account in the online forum is reported many times for sending illegal information, the server can freeze the first account (i.e., to suspend the first account) to warn the legitimate user of the first account not to send illegal information any more. When the freezing time reaches the fourth predetermined time, the server can release the first account, and enable the legitimate user of the first account to continue to use the first account in the online forum.

It should also be noted that, in the payment scenario, the account processing method for providing an alert message can also include: recording freezing time; determining whether a fee has been paid during the fifth predetermined time period starting from the freezing time; if a fee has been paid during the fifth predetermined time period starting from the freezing time, releasing the first account; if a fee has not been paid during the fifth predetermined time period starting from the freezing time, freezing or deleting all information related to the first account. In another words, in some scenarios, if a fee has not paid to the first account, the first account can be frozen until a fee is paid to release the first account. Here, the fifth predetermined time can be the same as the second predetermined time. In other scenarios, such as if there is a fee due for the first account associated with a cellphone number, the first account can be frozen; and if the fee is not paid to the first account in a predetermined time period, then the user of the first account likely would not want to continue to use the first account. Thus, when the first account is frozen for a predetermined time period, all information related to the first account can be deleted, so that the network operator can provide the first account as a new account without any information to other users.

In sum, this embodiment of the present invention provides an account processing method for providing an alert message: after determining that the first account meets a processing condition, sending an alert message to the second account associated with the first account, and freezing all of the information associated with the first account. Friends of the legitimate user can see the alert message associated with the first account during the first account's freezing period, and can contact the legitimate user offline and inform the user that the legitimate user's account is frozen or about to be cancelled. Thus, this embodiment of the present invention addresses the problem of an illegal user processing the account without the knowledge of the legitimate user. By having friends of the legitimate user to monitor whether the account of the legitimate user is about to be cancelled, and if so, notify the legitimate user, this embodiment of the present invention prevents the immeasurable loss caused by the cancellation of the first account.

EXAMPLE 4

Figure 4:
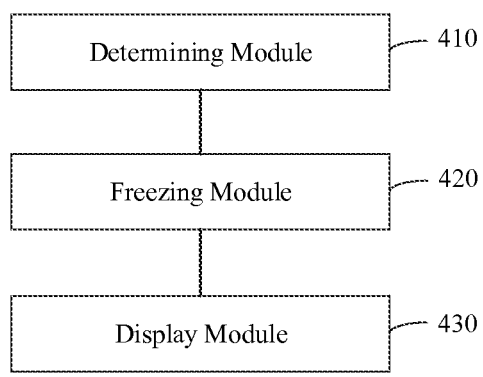
FIG. 4 is an exemplary schematic diagram for an account processing apparatus for providing an alert message in accordance with a fourth embodiment of the present invention.

As shown in FIG. 4, an exemplary schematic diagram for an account processing apparatus for providing an alert message in accordance with a fourth embodiment of the present invention is provided. The account processing apparatus for providing an alert message can be implemented as a server or part of a server.

The account processing apparatus includes a determining module 410, a freezing module 420 and a display module 430.

The determining module 410 can be used for determining whether the first account meets a processing condition.

The freezing module 420 can be used for freezing all information related to the first account if the first account meets the processing condition.

The display module 430 can be used for providing an alert message based on the processing condition to a second account associated with the first account, wherein the alert message indicates that the first account is frozen, the first account will be cancelled after a first predetermined time, or the first account will be released after a second predetermined time.

In sum, this embodiment of the present invention provides an account processing apparatus for providing an alert message: after determining that the first account meets a processing condition, displaying an alert message to the second account associated with the first account, and freezing all of the information associated with the first account. Friends of the legitimate user can see the alert message associated with the first account during the first account's freezing period, and can contact the legitimate user offline and inform the user that the legitimate user's account is frozen or about to be cancelled. Thus, this embodiment of the present invention addresses the problem of an illegal user processing the account without the knowledge of the legitimate user. By having friends of the legitimate user to monitor whether the account of the legitimate user is about to be cancelled, and if so, notify the legitimate user, this embodiment of the present invention prevents the immeasurable loss caused by the cancellation of the first account.

EXAMPLE 5

Figure 5:
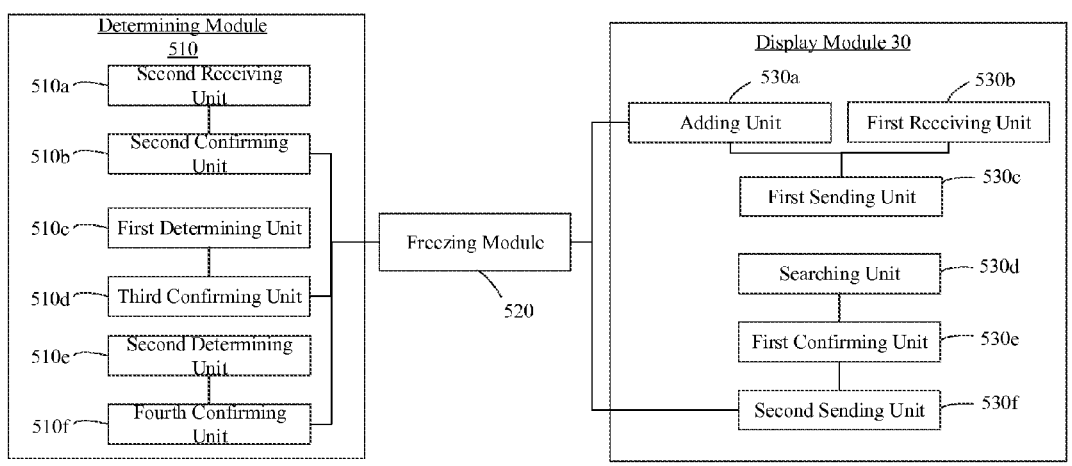
FIG. 5 is an exemplary schematic diagram for an account processing method for providing an alert message in accordance with a fifth embodiment of the present invention.

As shown in FIG. 5, an exemplary schematic diagram for an account processing apparatus for providing an alert message in accordance with a fifth embodiment of the present invention is provided.

The account processing apparatus for providing an alert message can be implemented as a server or part of a server. The account processing apparatus can include a determining module 510, a freezing module 520 and a display module 530.

The determining module 510 can be used for determining whether the first account meets a processing condition.

In one embodiment of the present invention, the determining module 510 can include a second receiving unit 510a and a second confirmation unit 510b.

The second receiving unit 510a can be used for receiving a request to process the first account.

The second confirmation unit 510b can be used for confirming the first account meets the processing condition after the second receiving unit 510a receives the request to process the first account, wherein the processing is a cancellation condition.

In another embodiment of the present invention, the determining module 510 can include a first determining unit 510c and a third confirmation unit 510d.

The first determining unit 510c can be used for determining whether the number of complaints filed against the first account is greater than a predetermined threshold value.

The third confirmation unit 510c can be used for confirming that the first account meets the processing condition when the first determining unit 510c determines that the number of complaints filed against the first account is greater than the predetermined threshold value, wherein the processing is a suspension condition.

In yet another embodiment of the present invention, the determining module 510 can include a second determining unit 510e and a forth confirmation unit 510f.

The second determining unit 510e can be used for determining whether there is a fee due for the first account.

The forth confirmation unit 510 can be used for confirming that the first account meets the processing condition when the second determining unit 510e determines there is a fee due for the first account, wherein the processing information is a payment condition.

The freezing module 520 can be used for freezing all information related to the first account when the determining module 510 determines that the first account meets the processing condition.

The display module 530 can be used for providing an alert message based on the processing condition to a second account associated with the first account, wherein the alert message indicates that the first account is frozen, the first account will be cancelled after a first predetermined time, or the first account will be released after a second predetermined time.

In one embodiment of the present information, the display module 530 can include an adding unit 530a, a first receiving unit 530b and a first sending unit 530c.

The adding unit 530a can be used for adding the alert message to the visible information of the first account based on the processing condition. Visible information is information related to the the first account that is displayed to the second account or can be seen in the second account.

Specifically, the adding unit 530a can include a processing subunit and an adding subunit for.

The processing subunit can be used for, if the visible information includes image information, converting an image to grayscale.

The adding subunit can be used for, if the visible information includes image information, registration information, signature information, or information in a dialog window, adding the alert message to the an image, registration information, signature information, or information in the dialog window.

The first receiving unit 530b can be used for receiving a request from the second account requesting the visible information of the first account to the second account.

The first sending unit 530c can be used for, after the first receiving unit 530b receiving the request from the second account, sending the visible information of the first account containing the alert message to the second account.

In another embodiment of the present invention, the display module 530 can include a searching unit 530d, a first confirmation unit 530e, and a second sending unit 530f.

The searching unit 530d can be used for searching the friends list and reserve account associated with the first account. More generally, the searching unit 530d can be used to search the social network of the first account, i.e., those accounts that the first account has interaction with. For example, in a chat room, such accounts may include all the accounts that the first account has chatted with. In another example, in an online forum, such accounts may include all the accounts within a group that the first account is a member. The first confirmation unit 530e can be used for confirming the second account associate with the first account based on the friends list and the reserve account associated with the first account found by the searching unit 530d. More generally, the first confirmation unit 530e may also be used to confirm any account within the social network of the first account, such as any account that the first account has chatted. The first confirmation unit 530e may also take into consideration the level of quality of interaction within the first account's social network. For example, the first confirmation unit 530e may confirm an account that the first account has chatted 3 times within the past week, but deny an account that the first account chatted once in the past six months.

The second sending unit 530f can be used for sending the alert message associated with the first account to the second account associated with the first account confirmed by the first confirmation unit 530e according to the processing condition for displaying in the second account.

In one embodiment of the present invention, the alert message includes pre-cancellation information, freezing information or pre-release information. The display module 530 can be used for if the processing condition is the cancellation condition, displaying in the second account associated with the first account pre-cancellation information, or freezing information and pre-cancellation information;

if the processing condition is the suspension condition, displaying in the second account associated with the first account freezing information, freezing information and pre-cancellation, or freezing information and pre-release information; and if the processing condition is the payment condition, displaying in the second account associated with the first account freezing information, or freezing information and pre-cancellation information.

Wherein, the pre-cancellation information indicates that the first account will be cancelled after the first predetermined time, the freezing information indicates that the first account is frozen; the pre-release information indicates that the first account will be released after the second predetermined time.

In sum, this embodiment of the present invention provides an account processing apparatus for providing an alert message: after determining that the first account meets a processing condition, displaying an alert message to the second account associated with the first account, and freezing all of the information associated with the first account. Friends of the legitimate user can see the alert message associated with the first account during the first account's freezing period, and can contact the legitimate user offline and inform the user that the legitimate user's account is frozen or about to be cancelled. Thus, this embodiment of the present invention addresses the problem of an illegal user processing the account without the knowledge of the legitimate user. By having friends of the legitimate user to monitor whether the account of the legitimate user is about to be cancelled, and if so, notify the legitimate user, this embodiment of the present invention prevents the immeasurable loss caused by the cancellation of the first account.

EXAMPLE 6

Figure 6:
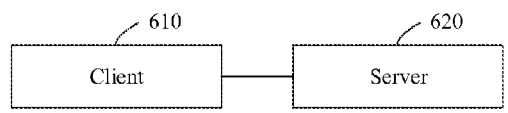
FIG. 6 is an exemplary schematic diagram for an account processing system for providing an alert message in accordance with a sixth embodiment of the present invention.

As shown in FIG. 6, an exemplary schematic diagram for an account processing system for providing an alert message in accordance with a sixth embodiment of the present invention is provided. The account processing system can include client 610 and server 620, wherein the client 610 can be an electronic device that can be used to log in to the first account or the second account. The server 620 can include the accounting processing apparatus for providing an alert message in accordance with the fifth embodiment of the present invention, or the server 620 can be the accounting processing apparatus for providing an alert message in accordance with the fifth embodiment of the present invention. Here, the client 610 can be, but is not limited to, a desktop computer, a laptop, a netbook, a tablet, a mobile phone, or a multimedia TV. The client can be one or more than one. For example, the client used to log in to the first account and the client used to log in to the second account can be the same client, or can be different clients.

It should be noted that, in the above descriptions, the various modules having various functions are merely exemplary examples used to illustrate the account processing apparatus in accordance with the embodiments of the present invention. In practice, the various functions can be allocated to different modules based on need, and the server can be divided into different modules to perform the whole or part of the functions described above. In addition, operational principles of the accounting process apparatus in accordance with embodiments of the present invention are the same as those of the accounting process methods, and will not be repeated here.

The numbering of the embodiments of the present invention is done solely for convenience, and does not represent the comparative merits of the embodiments. Those skilled in the art will understand that all or part of the embodiments of the present invention can be implemented by computer hardware, or computer program controlling hardware. The computer program can be stored in a computer readable storage media, which can be read-only memory, magnetic disk or optical disk, etc.

The various embodiments of the present invention are merely preferred embodiments, and are not intended to limit the scope of the present invention, which includes any modification, equivalent, or improvement that does not depart from the the spirit and principles of the present invention.

What is claimed is:

1. An account processing method for providing an alert message for use in a server processing a first account to prevent account loss caused by user hijacking activities when a legitimate user of the first account does not login with the first account during an account freezing period, the method comprising:
   determining, by the server, whether the first account meets a processing condition, wherein the server comprises at least one processor for maintaining an online social network service for a plurality of online user accounts including the first account;
   if the first account meets the processing condition, freezing, by the server, all information related to the first account;
   in response to the server freezing the all information related to the first account, automatically generating, by the server, an alert message based on the processing condition, the alert message indicating that the first account is frozen, the first account will be cancelled after a first predetermined time, or the first account will be released after a second predetermined time;
   automatically identifying, by the server among the plurality of online user accounts, a second account associated with the first account, the second account being owned by a different account holder than the first account, and the second account being an online follower account subscribed to the first account; and
   providing, by the server, the alert message to the second account, wherein the alert message is displayed by a user client after a user logs in to the second account,
   wherein the step of providing, by the server, the alert message to the second account further comprises:
      in response to the server freezing all information related to the first account, automatically adding, by the server, the alert message to visible information of the first account based on the processing condition;
      receiving a request from the second account requesting the visible information of the first account; and
      after receiving the request from the second account, sending, by the server, the visible information of the first account containing the alert message to the second account, wherein the visible information of the first account containing the alert message is displayed by the user client of the second account in response to the request,
   wherein the step of adding the alert message to the visible information of the first account further comprises:
      if the visible information comprises an image, converting the image to grayscale for indicating that the first account is frozen; and
      if the visible information comprises registration information, signature information, or information in a dialog window, adding the alert message to the registration information, the signature information, or the information in the dialog window.

2. The method of claim 1, further comprising:
   searching a follower list associated with the first account;
   confirming the second account associated with the first account based on the follower list, wherein the second account receives visible information of the first account but the first account and the second account are not friends; and
   in response to the server freezing the all information related to the first account, automatically sending the alert message associated with the first account to the second account according to the processing condition for displaying in the second account.

3. The method of claim 1, wherein the step of testing whether the first account meets a processing condition further comprises:
   if the processing condition is a cancellation condition, receiving a request to process the first account; and after receiving the request to process the first account, confirming the first account meets the processing condition;
   if the processing condition is a suspension condition, determining whether a number of complaints filed against the first account is greater than a predetermined threshold value; and if the number of complaints filed against the first account is greater than the predetermined threshold value, confirming that the first account meets processing condition; and
   if the processing condition is a payment condition, determining whether there is a fee due for the first account; and if there is a fee due for the first account, confirming that the first account meets the processing condition.

4. The method of claim 3, wherein the alert message comprises pre-cancellation information, freezing information or pre-release information, the pre-cancellation information indicates that the first account will be cancelled after the first predetermined time, the freezing information indicates that the first account is frozen; the pre-release information indicates that the first account will be released after the second predetermined time, the method further comprises:
   if the processing condition is the cancellation condition, displaying in the second account associated with the first account pre-cancellation information, or freezing information and pre-cancellation information;
   if the processing condition is the suspension condition, displaying in the second account associated with the first account freezing information, freezing information and pre-cancellation, or freezing information and pre-release information; and
   if the processing condition is the payment condition, displaying in the second account associated with the first account freezing information, or freezing information and pre-cancellation information.

5. The method of claim 3, further comprising:
   if the first account meets the cancellation condition, determining, by the server, whether a freezing time of the first account has reached a third predetermined time; and
   if the freezing time of first account has reached the third predetermined time, deleting, by the server, the all information related to the first account.

6. The method of claim 3, further comprising:
if the first account meets the suspension condition, determining, by the server, whether a freezing time of the first account has reached a fourth predetermined time; and
if the freezing time of first account has reached the fourth predetermined time, releasing, by the server, the frozen first account, wherein the first account is enabled for continued usage.

7. The method of claim 3, further comprising:
if the first account meets the payment condition, determining, by the server, whether the fee has been paid during a fifth predetermined time period starting from the freezing time;
if the fee has been paid during the fifth predetermined time period, releasing the first account; and
if the fee has not been paid during the fifth predetermined time period, deleting the all information related to the first account.

8. An account processing apparatus for providing an alert message for use in a server processing a first account to prevent account loss caused by user account hijacking activities when a legitimate user of the first account does not login with the first account during an account freezing period, comprising at least one processor configured to execute:
a determining module for determining whether the first account meets a processing condition, wherein the server maintains an online social network service for a plurality of online user accounts including the first account;
a freezing module for freezing all information related to the first account if the first account meets the processing condition;
a display module for:
in response to the freezing of the all information related to the first account, automatically generating an alert message based on the processing condition, the alert message indicating that the first account is frozen, the first account will be cancelled after a first predetermined time, or the first account will be released after a second predetermined time;
automatically identifying, among the plurality of online user accounts, a second account associated with the first account, the second account being owned by a different account holder than the first account, and the second account being an online follower account subscribed to the first account; and
providing the alert message to the second account, wherein the alert message is displayed by a user client after a user logs in to the second account,
wherein the display module is further configured for:
in response to the server freezing all information related to the first account, automatically adding, by the server, the alert message to visible information of the first account based on the processing condition;
receiving a request from the second account requesting the visible information of the first account; and
after receiving the request from the second account, sending, by the server, the visible information of the first account containing the alert message to the second account, wherein the visible information of the first account containing the alert message is displayed by the user client of the second account in response to the request,
wherein adding the alert message to the visible information of the first account further comprises:
if the visible information comprises an image, converting the image to grayscale for indicating that the first account is frozen; and
if the visible information comprises registration information, signature information, or information in a dialog window, adding the alert message to the registration information, the signature information, or the information in the dialog window.

9. The apparatus of claim 8, wherein the display module further comprises:
a searching unit for searching a follower list associated with the first account;
a first confirmation unit for confirming the second account associate with the first account based on the follower list, wherein the second account receives visible information of the first account but the first account and the second account are not friends; and
a second sending unit for in response to the freezing of the all information related to the first account, automatically sending the alert message associated with the first account to the second account according to the processing condition for displaying in the second account.

10. The apparatus of claim 8, wherein the determining module further comprises:
a second receiving unit for receiving a request to process the first account;
a second confirmation unit for confirming the first account meets the processing condition after the second receiving unit receives the request to process the first account, wherein the processing is a cancellation condition;
a first determining unit for determining whether a number of complaints filed against the first account is greater than a predetermined threshold value;
a third confirmation unit for confirming that the first account meets the processing condition when the first determining unit determines that the number of complaints filed against the first account is greater than the predetermined threshold value, wherein the processing is a suspension condition;
a second determining unit for determining whether there is a fee due for the first account; and
a forth confirmation unit for confirming that the first account meets the processing condition when the second determining unit determines there is a fee due for the first account, wherein the processing information is a payment condition.

11. The apparatus of claim 10, wherein the alert message comprises pre-cancellation information, freezing information or pre-release information, the pre-cancellation information indicates that the first account will be cancelled after the first predetermined time, the freezing information indicates that the first account is frozen; the pre-release information indicates that the first account will be released after the second predetermined time, and the display module is configured for
if the processing condition is the cancellation condition, displaying in the second account associated with the first account pre-cancellation information, or freezing information and pre-cancellation information;
if the processing condition is the suspension condition, displaying in the second account associated with the first account freezing information, freezing information and pre-cancellation, or freezing information and pre-release information; and
if the processing condition is the payment condition, displaying in the second account associated with the first account freezing information, or freezing information, or freezing information and pre-cancellation information.

12. An apparatus for displaying an alert message to prevent account loss caused by user account hijacking activities when a legitimate user of the first account does not login with the first account during an account freezing period, comprising:
   a client for logging in to a second account onto a server, wherein the server comprises at least one processor for maintaining an online social network service for a plurality of online user accounts including the second account and a first account;
   a first confirmation unit for confirming the first account associated with the second account, the second account being owned by a different account holder than the first account, and the second account being an online follower account subscribed to the first account;
   a display module for displaying visible information of the first account;
   a first receiving unit for receiving an alert message related to the first account from the server, the alert message indicating that the first account is frozen, the first account will be cancelled after a first predetermined time, or the first account will be released after a second predetermined time;
   an adding unit for: adding the alert message to the visible information of the first account;
   wherein the alert message is automatically generated by the server when the server determines to freeze all information related to the first account, and the display module is for displaying the visible information of the first account containing the alert message,
   wherein the client is further configured for:
      sending a request from the second account requesting the visible information of the first account; and
      receiving, from the server, the visible information of the first account containing the alert message to the second account, wherein the visible information of the first account containing the alert message is displayed by the client of the second account;
   wherein the adding unit is further configured for:
      if the visible information comprises an image, converting the image to grayscale for indicating that the first account is frozen; and
      if the visible information comprises registration information, signature information, or information in a dialog window, adding the alert message to the registration information, the signature information, or the information in the dialog window.

13. The apparatus of claim 12, further comprising:
   a searching unit for searching a follower list of the second account; wherein the first confirmation unit confirms the first account based on the follower list of the second account, and the second account receives visible information of the first account but the first account and the second account are not friends.

14. The apparatus of claim 12, wherein the second account is specified by the first account.

15. The apparatus of claim 12, wherein the second account is selected from a social network of the first account.

16. The apparatus of claim 12, further comprising:
   a first requesting unit for requesting the alert message related to the first account.

* * * * *